Patented Oct. 4, 1949

2,483,530

UNITED STATES PATENT OFFICE 2,483,530

BETA-ETHOXY-ALPHA-PHENYLACET-AMIDOACRYLIC ACID

Robert L. Clark, Woodbridge, N. J., assignor to Merck & Co., Inc., Rahway, N. J., a corporation of New Jersey No Drawing. Original application August 14, 1946, Serial No. 690,597. Divided and this application June 21, 1947, Serial No. 756,329

1 Claim. (Cl. 260—519)

This invention relates to methods of preparing compounds useful in the synthesis of penicillin.

This application is a division of my copending application, Serial No. 690,597, filed August 14, 1946.

Regarded in certain of its broader aspects the process in accordance with the present invention comprises reacting an organic solvent solution of β,β-dialkoxy-α-phenylacetamidopropionic acid with a phosphorus halide to form 2-benzyl-4-alkoxymethylene-5(4)-oxazolone hydrohalide, hydrolyzing the latter compound and recovering β-alkoxy-α-phenylacetamidoacrylic acid. This reaction can be indicated graphically as follows:

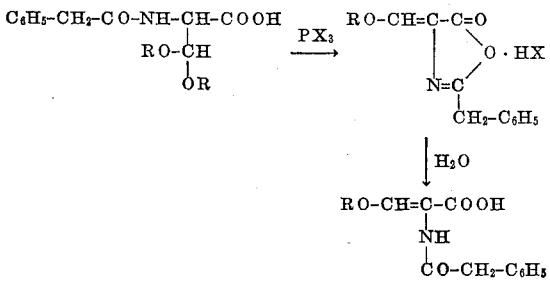

wherein R represents an alkyl radical and X represents halogen.

The condensation of 2-benzyl-4-alkoxymethylene-5(4)-oxazolone with d-penicillamine in the presence of a nitrogenous liquid condensing agent results in the formation of substances having penicillin activity. This process is disclosed and claimed in an application to my colleagues Harris and Folkers, Serial No. 656,772, filed March 23, 1946, now U. S. Patent 2,480,466.

The starting material employed in the present invention, namely β,β-dialkoxy-α-phenylacetimidopropionic acid, can be prepared by reacting an alkyl ester of phenacetamidoacetic acid and methyl formate to form an alkyl ester of α-formylphenaceturic acid reacting the latter compound with anhydrous hydrogen chloride in an alkanol to form the corresponding ester of α,α-dialkoxy-α-phenylacetamidopropionic acid, reacting the ester with alkali and acidifying the reaction mixture to form β,β-dialkoxy-α-phenylacetamidopropionic acid. This method is fully disclosed and claimed in a co-pending application to my colleagues Harris, Arth, Hoffman and Folkers, Serial No. 636,516, filed December 21, 1945.

In accordance with a preferred embodiment of my invention β,β-diethoxy-α-phenylacetamidopropionic acid is dissolved in an organic solvent such as dioxane and a phosphorus halide, such as phosphorus tribromide or phosphorus trichloride is added to the solution. The reaction is preferably conducted at room temperature. The reaction is completed in about a half hour with the precipitation of white crystals of 2-benzyl-4-ethoxymethylene-5(4)-oxazolone hydrohalide. These crystals are separated from the solution by filtration and washed with dioxane and absolute ether. The product is then dried in a vacuum desiccator as it is extremely hygroscopic. This reaction product is insoluble in water and ether and soluble in chlorinated organic solvents.

While substantially pure 2-benzyl-4-ethoxymethylene-5(4)-oxazolone hydrohalide is recovered by merely filtering off the white crystalline solid and washing with dioxane and ether, it will be noted that further purification may be necessary or desirable. This can be accomplished by recrystallizing the product from a chlorinated organic solvent such as ethylene dichloride.

When water is added to 2-benzyl-4-ethoxymethylene-5(4)-oxazolone hydrohalide at room temperature the solid changes to a liquid with a density greater than that of water. The reaction mixture is stirred until the heavier liquid solidifies and β-ethoxy-α-phenylacetamidoacrylic acid is recovered by filtration. This product can be crystallized from ethylene dichloride.

The following example sets forth a method of carrying out the present invention, but it is to be understood that this example is given by way of illustration and not of limitation.

Example 1

3 gm. of β,β-diethoxy-α-phenylacetamidopropionic acid was dissolved in 16.0 ml. of dioxane and 3.0 ml. of phosphorus tribromide was added. After thirty minutes white crystals of 2-benzyl-4-ethoxymethylene-5(4)-oxazolone hydrobromide precipitated from the solution and were removed by filtration. The crystals were washed with dioxane and absolute ether and immediately dried in a vacuum desiccator.

400 mg. of the crystals were recrystallized from 7.0 ml. of ethylene dichloride and 2.0 ml. of ether. The crystals thus obtained had an indefinite melting point, softening at 90° C., but not melting until 115° C.

Analysis calculated for $C_{13}H_{14}O_3NBr$: C, 50.01; H, 4.52; N, 4.49. Found: C, 50.09; H, 4.27; N, 4.73.

3 gm. of 2-benzyl-4-ethoxymethylene-5(4)-oxazolone hydrobromide was added to 30 ml. of water and the mixture stirred until the oil solidified. The solid was removed by filtration and crystallized from ethylene dichloride. β-ethoxy-α-phenylacetamidoacrylic acid having a melting point of 134–135° C. was recovered.

Anal. Calcd. for $C_{13}H_{15}O_4N$: C, 62.64; H, 6.07; N, 5.62. Found: C, 62.90; H, 6.40; N, 5.59.

Modifications may be made in carrying out the present invention without departing from the spirit and scope thereof and the invention is to be limited only by the appended claim.

I claim:

β-ethoxy-α-phenylacetamidoacrylic acid.

ROBERT L. CLARK.

REFERENCES CITED

The following references are of record in the file of this patent:

UNITED STATES PATENTS

| Number | Name | Date |
|---|---|---|
| 2,394,967 | Kushner | Feb. 12, 1946 |
| 2,430,455 | Crooks | Nov. 11, 1947 |

FOREIGN PATENTS

| Number | Country | Date |
|---|---|---|
| 318,582 | Great Britain | Oct. 3, 1929 |

OTHER REFERENCES

Erlenmeyer, "Ber. deut. Chem.," vol. 33 (1900), pp. 2036–2041.

Erlenmeyer, "Liebigs Annalen," vol. 275, page 8.

Erlenmeyer, "Liebigs Annalen," vol. 337, pp. 265–270 (1904).

Bergmann et al., "Liebigs Annalen," vol. 448 (1926), pp. 20–31.

Bergmann et al., "Liebigs Annalen," vol. 458 (1927), pp. 77, 80–83.

Carter et al., "J. Biol. Chem.," vol. 129 (1934), pp. 361–362.

Ramage et al., "Jour. Chem. Soc.," (London) 1935, pp. 534–535.

Carter et al., "J. Biol. Chem.," vol. 139 (1941), pp. 258–260.

Squibb Report No. XII, b, April 1, 1944, page 2, published Sept. 27, 1945.

Merck Report No. 35, June 27, 1944, page 8, published Sept. 27, 1945.

Upjohn Report No. XI, July 10, 1944 to Aug. 10, 1944, pp. 6, 19 and 25, published Sept. 27, 1945.